| (12) | United States Patent | (10) Patent No.: | US 10,361,597 B2 |
|---|---|---|---|
| | Juris | (45) Date of Patent: | Jul. 23, 2019 |

(54) ELECTRIC MACHINE FOR A MOTOR VEHICLE, COIL CARRIER FOR AN ELECTRIC MACHINE, AND MOTOR VEHICLE

(71) Applicant: AUDI AG, Ingolstadt (DE)

(72) Inventor: Peter Juris, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 217 days.

(21) Appl. No.: 15/434,811

(22) Filed: Feb. 16, 2017

(65) Prior Publication Data

US 2017/0237306 A1  Aug. 17, 2017

(30) Foreign Application Priority Data

Feb. 17, 2016  (DE) .................. 10 2016 001 838

(51) Int. Cl.

| H02K 9/19 | (2006.01) |
|---|---|
| H02K 3/24 | (2006.01) |
| H02K 1/20 | (2006.01) |
| B60L 1/02 | (2006.01) |
| H02K 1/14 | (2006.01) |
| H02K 1/16 | (2006.01) |
| H02K 3/28 | (2006.01) |
| H02K 9/197 | (2006.01) |
| H02K 3/52 | (2006.01) |
| B60L 50/50 | (2019.01) |

(52) U.S. Cl.

CPC ................. *H02K 1/20* (2013.01); *B60L 1/02* (2013.01); *B60L 50/50* (2019.02); *H02K 1/14* (2013.01); *H02K 1/16* (2013.01); *H02K 3/24* (2013.01); *H02K 3/28* (2013.01); *H02K 3/522* (2013.01); *H02K 9/197* (2013.01)

(58) Field of Classification Search

CPC ............ H02K 1/20; H02K 3/522; H02K 3/24; H02K 3/28; H02K 1/16; H02K 1/14; H02K 9/197; B60L 50/50; B60L 1/02; B60L 11/18

USPC ............................................ 310/52, 216.079

See application file for complete search history.

(56) References Cited

U.S. PATENT DOCUMENTS

| 3,963,950 A | 6/1976 | Watanabe et al. |
|---|---|---|
| 4,137,471 A | 1/1979 | Sato et al. |
| 6,515,384 B1 | 2/2003 | Kikuchi et al. |

(Continued)

FOREIGN PATENT DOCUMENTS

| CN | 202550775 | 11/2012 |
|---|---|---|
| CN | 204089484 | 1/2015 |

(Continued)

OTHER PUBLICATIONS

European Search Report dated Aug. 2, 2017 with respect to counterpart European patent application EP 17 15 3676.

(Continued)

*Primary Examiner* — John K Kim

(74) *Attorney, Agent, or Firm* — Henry M. Feiereisen LLC

(57) ABSTRACT

An electric machine for a motor vehicle includes a rotor, and a stator interacting with the rotor. The stator includes a laminated core, a coil carrier configured for a flow of a cooling fluid there through, and a coil assembly having a plurality of stator coils and arranged in the coil carrier. The coil carrier has an enclosed configuration so as to form a fluid seal against the laminated core and the rotor.

18 Claims, 3 Drawing Sheets

(56) References Cited

U.S. PATENT DOCUMENTS

| | | | |
|---|---|---|---|
| 6,927,510 B1* | 8/2005 | Beitelman | B22D 11/115 |
| | | | 310/11 |
| 7,514,826 B2 | 4/2009 | Wakita | |
| 8,310,126 B1* | 11/2012 | Hopkins | H02K 1/148 |
| | | | 310/156.19 |
| 2002/0163256 A1* | 11/2002 | Tajima | H02K 41/0356 |
| | | | 310/12.29 |
| 2003/0062780 A1 | 4/2003 | Kaneko et al. | |
| 2006/0082241 A1* | 4/2006 | Enomoto | H02K 1/02 |
| | | | 310/216.004 |
| 2006/0145548 A1* | 7/2006 | Wakita | H02K 3/24 |
| | | | 310/54 |
| 2006/0273668 A1 | 12/2006 | Bibeau et al. | |
| 2008/0256783 A1 | 10/2008 | Alfermann et al. | |
| 2009/0315414 A1 | 12/2009 | Shikayama et al. | |
| 2012/0248904 A1 | 10/2012 | Baumann et al. | |
| 2015/0372568 A1 | 12/2015 | Körner | |
| 2017/0237306 A1* | 8/2017 | Juris | H02K 1/20 |
| | | | 310/52 |
| 2017/0310189 A1* | 10/2017 | Hanumalagutti | B60K 6/26 |

FOREIGN PATENT DOCUMENTS

| | | |
|---|---|---|
| DE | 25 15 340 | 9/1976 |
| EP | 1 282 220 | 2/2003 |
| EP | 1 300 924 A2 | 4/2003 |
| EP | 2 475 082 | 7/2012 |
| GB | 2509738 | 7/2014 |
| JP | 4017539 | 9/2007 |
| JP | 2012-90434 | 4/2012 |

OTHER PUBLICATIONS

Translation of European Search Report dated Aug. 2, 2017 with respect to counterpart European patent application EP 17 15 3676.
Chinese Search Report dated Sep. 19, 2019 with respect to counterpart Chinese patent application 2017100832730.
Translation of Chinese Search Report dated Sep. 19, 2019 with respect to counterpart Chinese patent application 2017100832730.

* cited by examiner

ELECTRIC MACHINE FOR A MOTOR VEHICLE, COIL CARRIER FOR AN ELECTRIC MACHINE, AND MOTOR VEHICLE

CROSS-REFERENCES TO RELATED APPLICATIONS

This application claims the priority of German Patent Application, Serial No. 10 2016 001 838.0, filed Feb. 17, 2016, pursuant to 35 U.S.C. 119(a)-(d), the disclosure of which is incorporated herein by reference in its entirety as if fully set forth herein.

BACKGROUND OF THE INVENTION

The present invention relates to the field of electric machines for use in a motor vehicle.

The following discussion of related art is provided to assist the reader in understanding the advantages of the invention, and is not to be construed as an admission that this related art is prior art to this invention.

An electric machine for use in a motor vehicle should be able to provide a highest possible torque or power density. This, however, is accompanied by a high current density within the stator coils that is a major cause for overall losses of the electric machine. As a result, aspects of thermal stress resistance of such electric machines become increasingly the focus in terms of industrial development. Since also the properties of materials used for the manufacture of such an electric machine are greatly temperature-dependent, various approaches have been proposed to meet the need for cooling so as to satisfy the desired electromagnetic function as well as thermal and mechanical demands.

One approach in the art involves the use of cooling fluid to flow through the stator and stator coils. Cooling fluid flows hereby through the slots of the laminated core and can flow either through intermediate spaces between several stator coils in a slot or through particular recesses in individual stator coils. A seal is provided to seal the stator against the rotor in circumferential and axial directions. The presence of such a seal adversely affects, however, the electromagnetic behavior of the electric machine through increase of the air gap thereof.

US 2012/0248904 A1 discloses a liquid-cooled stator and rotor assembly for use as an electric motor or generator. The stator includes a housing having a first end bell, a second end bell, and at least one fluid orifice in the first end bell. A stator is fixed within a stator cavity of the housing. The stator includes a stator core and a plurality of windings for conducting a flow of electricity. A rotor for magnetically interacting with the stator is also included, the rotor being rotatably mounted between the first end bell and the second end bell within a rotor cavity. A first sealing ring and a second sealing ring are provided to form a fluid seal against the respective end bells and against a portion of the stator such that a cooling fluid entering the stator cavity via the orifice does not enter the rotor cavity. In this type of electric machines, the stator core contacts the cooling fluid so that the electric machine can be used only for a particular cooling fluid that is not corrosive to the stator core so that the application of efficient cooling fluids for cooling purposes is not possible.

It would therefore be desirable and advantageous to address these afore-mentioned problems and to obviate other prior art shortcomings.

SUMMARY OF THE INVENTION

According to one aspect of the present invention, an electric machine for a motor vehicle includes a rotor, and a stator interacting with the rotor, the stator including a laminated core, a coil carrier configured for a flow of a cooling fluid there through, and a coil assembly having a plurality of stator coils and arranged in the coil carrier, the coil carrier having an enclosed configuration so as to form a fluid seal against the laminated core and the rotor.

The present invention is based on the recognition that a direct cooling of the stator coils can be realized in the absence of any contact between the cooling fluid, on one hand, and both the rotor and the laminated core, on the other hand. For that purpose, instead of being arranged directly in the slots of the laminated core, the coil assembly is arranged in a separate coil carrier that holds the stator coils in a position in which the stator coils can interact with the rotor to generate a magnetomotive force. The term "enclosed configuration" relates in the context of the description to a coil carrier that is self-contained, but still has openings for inlet of cooling fluid or for allowing establishment of an electric connection of the coils. Examples of a cooling fluid include oil, water, an ester, or even coolant that has corrosive properties. It will also be appreciated that other fluids may be used instead; such as, e.g. gaseous cooling fluid, in which case the coil carrier is constructed also gastight.

The rotor of the electric machine may form both an external rotor and an internal rotor. Currently preferred is an electric machine with a rotor configured as internal rotor.

An electric machine according to the present invention can thus be used with a wide variety of cooling fluids since the fluidtight enclosure of the coil carrier prevents contact of any used cooling fluid with the stator and the rotor. As a result, any of the efficient cooling fluids, which cannot be used in conventional electric machines, may now find application.

According to another advantageous feature of the present invention, the laminated core can have several teeth, with the coil carrier having through openings defined by walls and traversed by the teeth, "'Teeth" relate hereby to parts of the laminated core that project out from a stator core or stator yoke and form the slots for receiving the coil assembly. Thus, the teeth guide the magnetic flux, generated by the stator coils, in the direction of the rotor. Advantageously, the teeth are configured to extend flush with a rotor-proximal outer surface of the coil carrier, so as to avoid a widening of an air gap between the stator and the rotor. The through openings are suitably configured to complement the teeth. Advantageously, the teeth are configured to form slots with parallel flanks to facilitate insertion of the coil carrier onto the laminated core.

According to another advantageous feature of the present invention, the walls of the coil carrier define flow passageways inside the coil carrier, with cooling fluid flowing through the flow passageways in an axial direction. Thus, the flow passageways extend in parallel relation to the teeth along a rotation axis of the rotor and effectively form a rib structure of the coil carrier. The distances between the teeth or the cross sectional areas of the flow passageways are hereby chosen to maintain minimum distances necessary for an effective electromagnet isolation.

According to another advantageous feature of the present invention, a bulkhead can extend in axial and radial directions and split at least one of the flow passageways. The minimum distances normally results in flow passageways that have a cross sectional areas which permit only slight flow rates. Through the presence of a bulkhead in each of the flow passageways, flow sub-passages are created that enable greater flow rates for the cooling fluid. Advantageously, the bulkhead can be structured to generate turbulence in the cooling fluid flowing through the at least one of the flow passageways. This further enhances hydrodynamic properties of the flow passageways. Based on the recognition that the flow of cooling fluid has settled hydrodynamically and thermally in the flow passageway after a certain flow path, depending on the axial length of the electric machine, the formation of a turbulence-causing structure of the bulkhead results in swirling within the flow passageway. As a result, the flow has a higher Nusselt number and thus causes a higher heat transfer coefficient. Examples of a turbulence-causing structure include notches or indentations in the bulkhead, or an undulated or zigzag configuration.

According to another advantageous feature of the present invention, the teeth can be configured for insertion into the laminated core and securement to the laminated core. Thus, when the electric machine is manufactured, the coil carrier can initially be arranged on the laminated core and then the teeth are inserted through the coil carrier into the laminated core. The electric machine can therefore be provided with teeth which, when fixed to the laminated core, could not be inserted through the through openings. As a result, a laminated core with teeth having parallel flanks or having tooth heads can be realized in an electric machine according to the present invention.

According to another advantageous feature of the present invention, the coil carrier can have an inlet line and an outlet line for circulation of cooling fluid through the coil carrier. The inlet and outlet lines may each be configured as an opening in an outer wall of the coil carrier for attachment of a hose. Advantageously, the inlet and outlet lines are provided on end faces of the coil carrier, respectively. In addition, the coil carrier can have an opening which is sealed in a fluidtight manner, and an electrical connection which is received in the opening for connection to the coil assembly.

According to another advantageous feature of the present invention, the coil carrier can include a plurality of ring-segment shaped coil carrier segments which are separated from one another in a fluidtight manner, with the coil carrier segments having arranged therein a plurality of coil assemblies in one-to-one correspondence. The coil carrier segments of the coil carrier can extend in axial direction and have a ring-segment shaped cross sectional area. Advantageously, a coil carrier segment can include several flow passageways. When manufacturing an electric machine with a rotor formed as an internal rotor, the coil carrier segments can be inserted from inside into the stator, in particular onto the teeth of the laminated core thereof. Thereafter, the rotor can be inserted into the electric machine. Of course, provision should be made for adequate distances between the coil carrier segments and the slots. Advantageously, the slots have parallel flanks. Conversely, when the rotor is an external rotor, the coil carrier segments can be placed upon the stator from outside. In general, provision should be made for adequate distances between the coil carrier segments to enable arrangement of the coil carrier segments, without tilting, to the laminated core in dependence of the diameter of the laminated core.

According to another advantageous feature of the present invention, the laminated core can be made of a plurality of ring-segment shaped core segments. Accordingly, the laminated core is comprised of several parts so that the core segments may, for example, be attached to a single-piece coil carrier that is not made of core segments, when manufacturing the electric machine. The core segments can, of course, be connected to one another in a detachable or permanent manner, after arrangement of the coil carrier, and subsequently assembled to form the laminated core.

An electric machine according to the present invention, which has coil carrier segments and core segments, enables a congruent arrangement of the coil carrier segments with the core segments on the stator, i.e. each core segment has associated thereto a carrier coil segment in the absence of an overlap. In addition, the electric machine may also be constructed in such a way that the coil carrier segments are arranged on the stator in circumferential offset relation to the core segments. Thus, provision is made for an overlap in this case between at least one coil carrier segment and several core segments or between at least one core segment and several coil carrier segments.

According to another advantageous feature of the present invention, the coil carrier or a respective coil carrier segment can be made of multiple parts including an outer wall and a base body which is open towards the outer wall for receiving the outer wall to close the base body, with the outer wall being fastened to the base body. This configuration enables a simple arrangement of the stator coils in the coil carrier. Securement can advantageously be realized by a joining process which is suited to the material of the coil carrier. The outer wall can hereby extend in axial and circumferential directions, i.e. the outer wall has recesses for through openings, when a coil carrier with through openings is involved. In this case, the base body can have a trough-shaped configuration. As an alternative, it is, of course, also conceivable to provide an outer end wall for securement to the base body. This may cause a more complicated arrangement of the coils in the coil carrier, however, joining of base body and end wall can be realized in a particularly simple manner by providing only a circumferential joining seam.

According to another aspect of the present invention, a coil carrier for an electric machine for a motor vehicle includes a hollow body configured for flow of a cooling fluid there through and having a plurality of a coil receiving spaces for placement of a stator coils of a coil assembly, respectively, the hollow body being configured so as to seal the coil assembly in a fluidtight manner against a laminated core and a rotor of the electric machine.

According to another advantageous feature of the present invention, the hollow body can include walls to define through openings for traversal of teeth of the electric machine. Advantageously, the walls can define flow passageways in the hollow body for flow of cooling fluid there through in an axial direction.

According to another advantageous feature of the present invention, a bulkhead can extend in axial and radial directions and split at least one of the flow passageways. To further improve hydrodynamic properties, the bulkhead can be structured to generate turbulence in the cooling fluid flowing through the at least one of the flow passageways.

According to another advantageous feature of the present invention, the coil carrier can have an inlet line and an outlet line for circulation of cooling fluid through the coil carrier and/or an opening which is sealed in a fluidtight manner, with an electrical connection received in the opening for connection to the coil assembly.

According to another advantageous feature of the present invention, the coil carrier can be made of multiple parts including a outer wall and a base body which is open towards the outer wall for receiving the outer wall to close the base body, with the outer wall being fastened to the base body.

According to another aspect of the present invention, a motor vehicle includes an electric machine which includes a rotor, and a stator interacting with the rotor, stator including a laminated core, a coil carrier configured for a flow of a cooling fluid there through, and a coil assembly having a plurality of stator coils and arranged in the coil carrier, said coil carrier having an enclosed configuration so as to be sealed fluidtight against the laminated core and the rotor.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
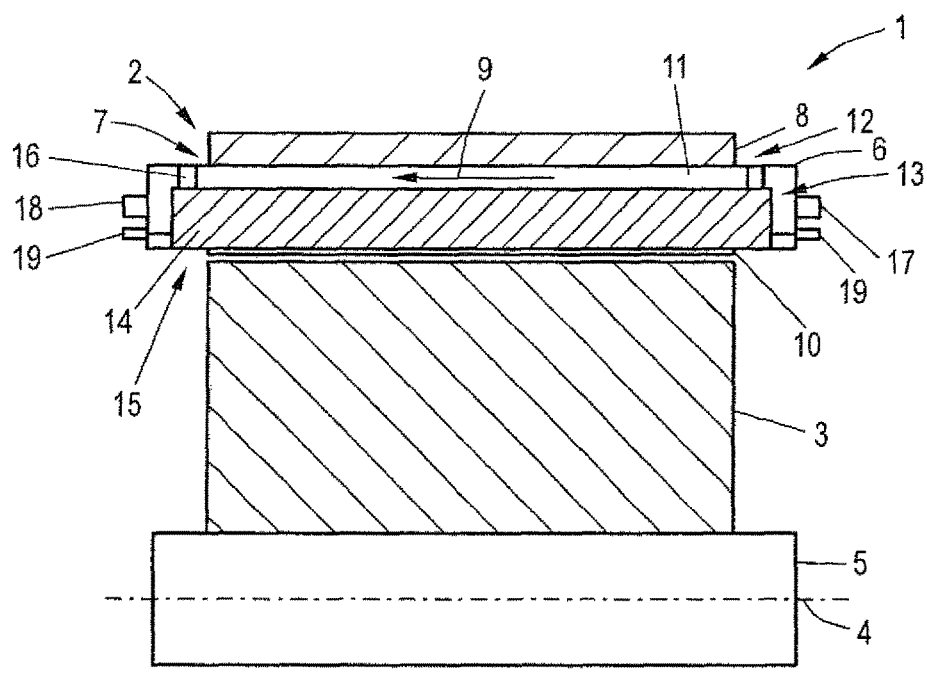
FIG. 1 is a basic cross sectional illustration of an electric machine according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a basic cross sectional illustration of an electric machine according to the present invention, generally designated by reference numeral 1. The electric machine 1 includes a stator 2 and a rotor 3 which is coupled to a shaft 5 rotating about a rotation axis 4.

The electric machine 1 includes a coil carrier 6 which is inserted into slots 7 of a laminated core 8 of the stator 2 and is configured in the form of a hollow body flowed through by a cooling fluid in a direction of arrow 9. The slots 7 are respectively formed between two adjacent teeth 10 of the laminated core 8, with the teeth 10 extending through through openings 12 of the coil carrier 6, with the through openings 12 being bounded by walls 11. Arranged in each of plural coil receiving spaces 13 is a stator coil 14 of several coil assemblies 15. A bulkhead 16 of the coil carrier 6 is arranged between each two through openings 12 or stator coils 14, with cooling fluid flowing along the bulkhead 16 through the coil carrier 6. Cooling fluid enters through inlet lines 17 on one end face of the coil carrier 6 and exits through outlet lines 18 on an opposite end face of the coil carrier 6. The coil carrier 6 further includes openings 19 at an end face for electric feeds for the coil assemblies 15. The coil carrier 6 thus has an enclosed configuration so as to form a fluid seal against the laminated core 8 and the rotor 3.

Figure 2:
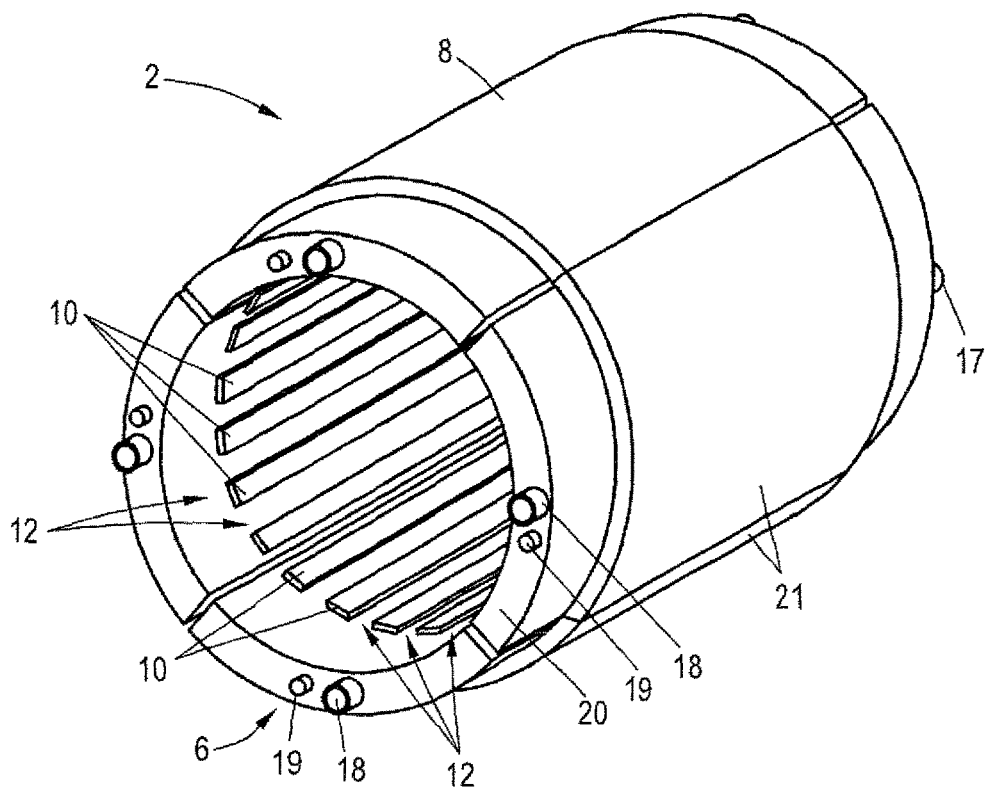
FIG. 2 is a perspective view of a stator of the electric machine of FIG. 1.

FIG. 2 shows a perspective view of the stator 2 of the electric machine 1 with the coil carrier 6. As is readily apparent from FIG. 2, the coil carrier 6 is comprised of four ring-segment shaped coil carrier segments 20 which are arranged in a fluidtight manner relative to one another. Each coil carrier segment 20 receives a coil assembly 15 and includes a corresponding one of the inlet lines 17, a corresponding one of the outlet lines 18, and the openings 19 for a corresponding electric feed.

FIG. 2 further shows the teeth 10 of the laminated core 8 to respectively extend through the through openings 12 of the coil carrier 6 so that each of the stator coils 14 is arranged about a corresponding one of the teeth 10 for a magnetic flux, generated by the stator coils 14, to be conducted in the direction of the rotor 3. By dividing the coil carrier 6 into the coil carrier segments 20, it becomes possible to place the coil carrier segments 20 upon the teeth 10, when assembling the electric machine 1, with clearances being provided depending on the circumference of the stator 2 and with the slots 7 being formed with parallel flanks. Although not shown in greater detail, the teeth 10 may also be configured for insertion into the laminated core 8 and for securement thereto. In this way, tooth geometries can be realized that do not allow per se a placement of the coil carrier segments 20, like teeth with parallel flanks or special tooth heads.

As is further readily apparent from FIG. 2, the laminated core 8 is comprised of four core segments 21 which are arranged in a congruent manner with the coil carrier segments 20. When assembling the electric machine 1, the coil carrier segments 20 may initially be inserted onto the corresponding ones of the core segments 21, and the core segments 21 are then joined together to form the laminated core 8 through securement in a detachable or permanent manner. In this way, the afore-described clearance between the coil carrier segments 20 may be omitted. Although not shown in detail, the coil carrier segments 20 and the core segments 21 may also be arranged in circumferential offset relationship so as to establish an overlap. It is also conceivable to use a single-piece coil carrier 6 onto which the core segments 21 can be placed from outside, when assembling the electric machine 1.

Figure 3:
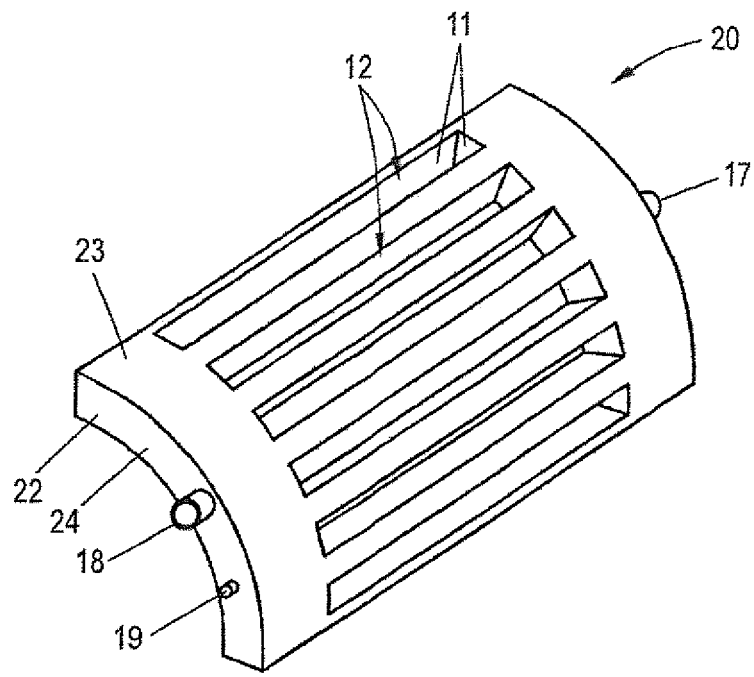
FIG. 3 is a perspective view of a coil carrier segment of the electric machine of FIG. 1.

FIG. 3 is a perspective view of one of the coil carrier segments 20 of the electric machine 1. Readily apparent from FIG. 3 are the individual through openings 12 which are bounded on four sides by the walls 11 to thereby establish a ribbed structure for engagement of the teeth 10 of the laminated core 8.

The coil carrier segment 20 includes a base body 22 (shown in greater detail in FIG. 4) and a separate outer wall 23 which extends in axial and circumferential directions. This split configuration enables a simple arrangement of the stator coils 14 by placing them into the trough-shaped base body 22. The outer wall 23 is then attached to the base body 22 by a joining process to close the base body 22. The base body 22 and the outer wall 23 are made of electrically insulating and thermally and mechanically resistant material, such as, e.g., polyetheretherketone (PEEK). Manufacture of the coil carrier segment 20 involves, e.g., a stereolithography process or a selective laser sintering process. In this way, slight material thicknesses of the walls 11, base body 22, and outer wall 23, can be realized.

While FIG. 3 shows the outer wall 23 in single-piece configuration with an end wall 24, it is, of course, also conceivable to use a separate end wall 24 instead of the outer wall 23. Although this would somewhat complicate the arrangement of the stator coils 14 in the respective base body. However, the coil carrier segment 20 requires only a single continuous joining seam about the end wall 24 in order to close the base body 22 coil carrier segment 20.

Figure 4:
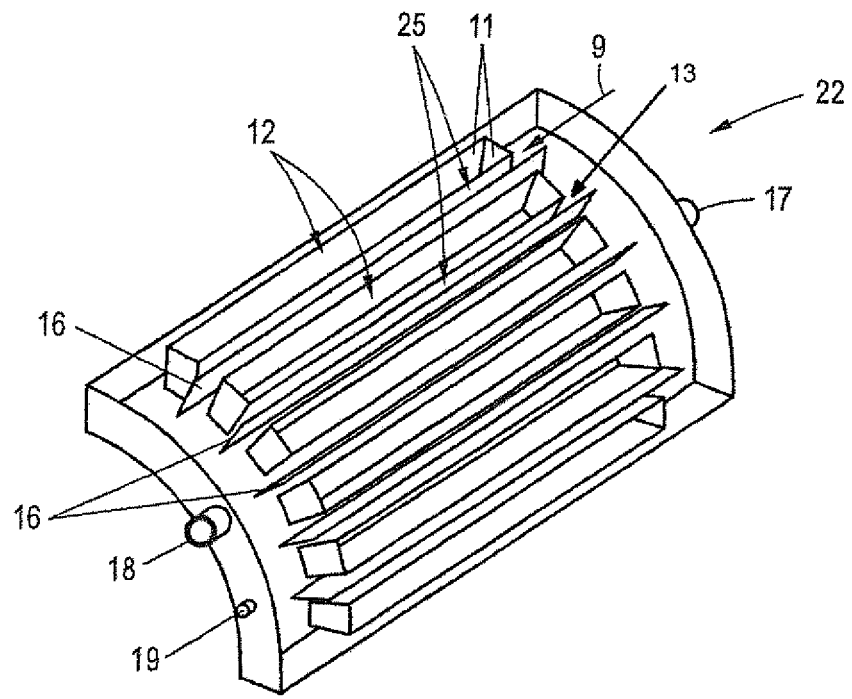
FIG. 4 is a perspective view of a base body of the coil carrier segment of FIG. 3.

FIG. 4 is a perspective view of the base body 22 of the coil carrier segment 20 shown in FIG. 3. The base body 22 of the coil carrier segment 20 has the coil receiving spaces 13, respectively defined about the walls 11 of each through opening 12. A flow passageway 25 is further formed between the walls 11 of adjacent through openings 12, with a bulkhead 16 extending axially along the flow passageway 25 so as to divide the flow passageway 25 into two flow sub-passages. As a result, the flow cross section for the cooling fluid is reduced to thereby enhance heat dissipation. Cooling fluid flowing in the direction of arrow 9 through the flow sub-passages settles down thermally and hydrodynamically much later so as to achieve an improved Nusselt number of the flow process.

Figure 5:
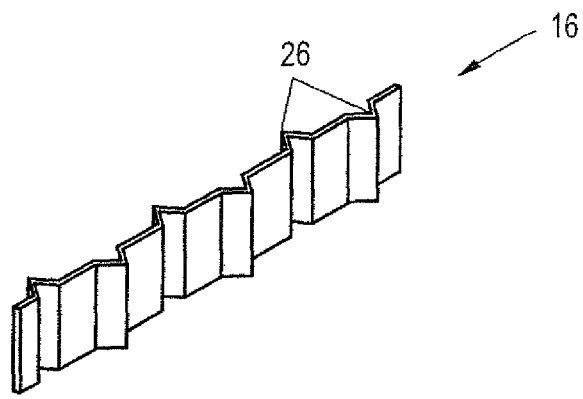
FIG. 5 is a perspective detailed view of a modified bulkhead for placement in the coil carrier segment of FIG. 3.

FIG. 5 is a perspective detailed view of a modified bulkhead 16 for placement in the coil carrier segment 20. In this variation, the bulkhead 16 is configured in axial direction with several notch-like structures 26 by which a turbulence is generated in the cooling fluid as it flows through the flow passageways 25. The turbulence of the cooling fluid causes targeted swirling to thereby further enhance heat dissipation of the stator coils 14 onto the cooling fluid. Configurations other than the notch-like structure 26 are, of course, also conceivable, such as, e.g. undulated structure, indented structure, or zigzag structure to generate the turbulence.

As described above, it is within the scope of the present invention, to provide a single-piece coil carrier 6 having a single hollow space which is closed in circumferential direction, Although FIG. 1 shows the rotor 3 of the electric machine as internal rotor, it is, of course, also conceivable to configure the rotor 3 as external rotor.

Figure 6:
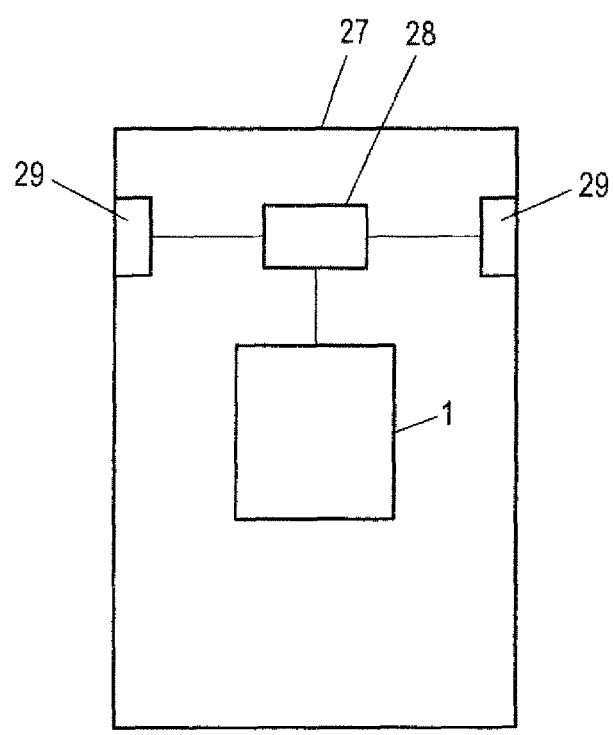
FIG. 6 is a schematic basic representation of a motor vehicle according to the present invention.

Referring now to FIG. 6, there is shown a schematic basic representation of a motor vehicle according to the present invention, generally designated by reference numeral 27. The motor vehicle 27 includes several wheels 29 which can be propelled by a drive train 28, and an electric machine 1 which is configured to at least temporarily and to at least assist a propulsion of the wheels 29 via the drive train 28.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. An electric machine for a motor vehicle, comprising:
a rotor; and
a stator interacting with the rotor, said stator including a laminated core, a coil carrier configured for a flow of a cooling fluid there through, and a coil assembly having a plurality of stator coils and arranged in the coil carrier, said coil carrier having an enclosed configuration so as to form a fluid seal against the laminated core and the rotor, wherein the laminated core has several teeth, said coil carrier having though opening defined by walls and traversed by the teeth, wherein the walls of the coil carrier define flow passageways inside the coil carrier, with cooling fluid flowing though the flow passageways in an axial direction, wherein the coil carrier includes at least one bulkhead arranged between two of said through opening and extending axially with respect to the rotor and the stator to divide at least one of the flow passageways.

2. The electric machine of claim 1, wherein the bulkhead is structured to generate turbulence in the cooling fluid flowing through the at least one of the flow passageways.

3. The electric machine of claim 1, wherein the teeth are configured for insertion into the laminated core and securement to the laminated core.

4. The electric machine of claim 1, wherein the coil carrier has an inlet line and an outlet line for circulation of the cooling fluid through the coil carrier.

5. The electric machine of claim 1, wherein the coil carrier has an opening which is sealed in a fluidtight manner, and an electrical connection received in the opening for connection to the coil assembly.

6. The electric machine of claim 1, wherein the coil carrier includes a plurality of ring-segment shaped coil carrier segments separated from one another in a fluidtight manner, and further comprising a plurality of said coil assembly, said coil assemblies received in the coil carrier segments in one-to-one correspondence.

7. The electric machine of claim 1, wherein the laminated core is made of a plurality of ring-segment shaped core segments.

8. The electric machine of claim 7, wherein the coil carrier includes a plurality of ring-segment shaped coil carrier segments separated from one another in a fluidtight manner and arranged on the stator in registry with the core segments.

9. The electric machine of claim 7, wherein the coil carrier includes a plurality of ring-segment shaped coil carrier segments separated from one another in a fluidtight manner and arranged on the stator in circumferential offset relationship to the core segments.

10. The electric machine of claim 1, wherein the coil carrier includes a plurality of ring-segment shaped coil carrier segments separated from one another in a fluidtight manner, each said coil carrier segment being made of multiple parts including an outer wall and a base body which is open towards the outer wall for receiving the outer wall to close the base body, said outer wall being fastened to the base body.

11. A coil carrier for an electric machine for a motor vehicle, said coil carrier comprising a hollow body configured for flow of a cooling fluid there through, said hollow body having a plurality of a coil receiving spaces for placement of stator cons of a coil assembly, respectively, said hollow body being configured so as to seal the coil assembly in a fluidtight manner against a laminated core and a rotor of the electric machine, wherein the laminated core has several teeth, said coil carrier having through openings defined by walls and traversed by the teeth, wherein the walls of the coil carrier define flow passageways inside the coil carrier, with cooling fluid flowing though the flow passageways in an axial direction, wherein the coil carrier includes at least one bulkhead arranged between two of said through opening and extending axially with respect to a rotor and a stator interacting with the rotor of the electric machine to divide at least one of the flow passageways.

12. The coil carrier of claim 11, wherein the hollow body includes walls to define through openings for traversal of teeth of the electric machine.

13. The coil carrier of claim 12, wherein the walls define flow passageways in the hollow body for flow of cooling fluid there through in an axial direction.

14. The coil carrier of claim 13, further comprising a bulkhead extending in axial and radial directions and splitting at least one of the flow passageways.

15. The coil carrier of claim 14, wherein the bulkhead is structured to generate turbulence in the cooling fluid flowing through the at least one of the flow passageways.

16. The coil carrier of claim 11, wherein the coil carrier has an inlet line and an outlet line for circulation of the cooling fluid through the coil carrier and/or an opening which is sealed in a fluidtight manner, with an electrical connection received in the opening for connection to the coil assembly.

17. The coil carrier of claim 11, wherein the coil carrier is made of multiple parts including an outer wall and a base body which is open towards the outer wall for receiving the outer wall to dose the base body, said outer well being fastened to the base body.

18. A motor vehicle, comprising an electric machine, said electric machine comprising a rotor, and a stator interacting with the rotor, stator including a laminated core, a coil carrier configured for a flow of a cooling fluid there through, and a coil assembly having a plurality of stator coils and arranged in the coil carrier, said coil carrier having an enclosed configuration so as to form a fluid seal against the laminated core and the rotor, wherein the laminated core has several teeth, said coil carrier having through openings defined by walls and traversed by the teeth, wherein the walls of the coil carrier define flow passageways inside the coil carrier, with cooling fluid flowing through the flow passageways in an axial direction, wherein the coil carrier includes at least one bulkhead arranged between two of said through openings and extending axially with respect to the rotor and the stator to divide at least one of the flow passageways.

* * * * *